United States Patent
Trattler et al.

(10) Patent No.: US 8,385,093 B2
(45) Date of Patent: Feb. 26, 2013

(54) VOLTAGE CONVERTER

(75) Inventors: Peter Trattler, Graz (AT); Jan Enenkel, Gratkorn (AT)

(73) Assignee: austriamicrosystems AG, Unterpremstatten (AT)

( * ) Notice: Subject to any disclaimer, the term of this patent is extended or adjusted under 35 U.S.C. 154(b) by 440 days.

(21) Appl. No.: 12/616,490

(22) Filed: Nov. 11, 2009

(65) Prior Publication Data

US 2010/0117556 A1    May 13, 2010

(30) Foreign Application Priority Data

Nov. 11, 2008    (DE) .................... 10 2008 056 748

(51) Int. Cl.
*H02M 3/18*    (2006.01)
(52) U.S. Cl. .................. 363/60; 307/110; 315/320
(58) Field of Classification Search .............. 363/59, 363/60; 307/109, 110; 315/291, 294, 295, 315/313, 320
See application file for complete search history.

(56) References Cited

U.S. PATENT DOCUMENTS

| | | | | |
|---|---|---|---|---|
| 4,451,743 | A * | 5/1984 | Suzuki et al. | 307/110 |
| 5,877,948 | A * | 3/1999 | Dijkmans | 363/60 |
| 6,118,678 | A * | 9/2000 | Limpaecher et al. | 363/60 |
| 6,169,673 | B1 * | 1/2001 | McIntyre et al. | 363/59 |
| 6,198,645 | B1 * | 3/2001 | Kotowski et al. | 363/59 |
| 6,563,235 | B1 | 5/2003 | McIntyre et al. | |
| 6,753,623 | B2 * | 6/2004 | McIntyre et al. | 307/109 |
| 6,920,055 | B1 | 7/2005 | Zeng et al. | |

* cited by examiner

*Primary Examiner* — Thuy Vinh Tran
(74) *Attorney, Agent, or Firm* — Cozen O'Connor

(57) ABSTRACT

A voltage converter is provided in which a first terminal (A) and a second terminal (B) are provided, each coupled to a switching means, the switching means is coupled to respective terminals for connecting a first capacitor (C1), a second capacitor (C2) and a third capacitor (C3), and the voltage converter is configured for being operated in first and second modes of operation each comprising at least three phases, and in which the three capacitors (C1, C2, C3) are inserted in series connection (S) between the first terminal (A) and a reference potential terminal (10) in one phase, and in each of the two other phases a first path and a second path (P1, P2) are provided in each case in parallel connection with at least one of the three capacitors (C1, C2, C3) related to the second terminal (B).

14 Claims, 4 Drawing Sheets

1. Phase      2. Phase      3. Phase

1. Phase      2. Phase      3. Phase

VOLTAGE CONVERTER

RELATED APPLICATION

This application claims the priority of German application no. 10 2008 056 748.5 filed Nov. 11, 2008, the entire content of which is hereby incorporated by reference.

FIELD OF THE INVENTION

The invention relates to a voltage converter.

BACKGROUND OF THE INVENTION

Voltage converters are used in electronic circuits where circuits parts are to be controlled or provided with a voltage which is larger or smaller than the supply voltage of the entire circuitry. Such voltages are required, for example, in driver circuits for illumination elements, in particular for light-emitting diodes (LEDs), in voltage supply circuits or to realize an efficient 3.3 V supply from a lithium-ion battery. These applications require the provision of differing output voltages for driving an electric load. In order to achieve an efficiency which is as good as possible, it is therefore necessary to provide several output voltages each being larger or smaller than the supply voltage so that one of these output voltages is as close as possible to the desired target value.

A voltage converter can be operated in a capacitive or inductive way. A known capacitive voltage converter comprises three capacitive elements which are operated in two phases. In the first phase the capacitive elements are connected in series. In the second phase the capacitive elements are connected in parallel. In this way, a supply voltage applied to the respective interconnection is provided in the second phase which is 1.33 times the amount of the supply voltage.

SUMMARY OF THE INVENTION

One object of the present invention is to further improve a voltage converter.

In one embodiment, a voltage converter is provided with first and second terminals each coupled to a switching means. The switching means is coupled to respective terminals for connecting a first capacitor, a second capacitor and a third capacitor. The voltage converter is configured for being operated in first and second modes of operation each comprising at least three phases. In one phase, the three capacitors are inserted in series connection between the first terminal and a reference potential terminal. In each of the two other phases, a first path and a second path are provided in each case in parallel connection with at least one of the three capacitors related to the second terminal.

The switching means enables a variable interconnection of the three capacitors among one another as well as to the first and second terminals in the two modes of operation with three phases each.

Advantageously, the variable interconnection of the three capacitors with the aid of the switching means increases the flexibility of the voltage converter.

In a further development, the first terminal is fed with an input voltage and an output voltage is provided at the second terminal in the first mode of operation. In the second mode of operation, the input voltage is supplied to the second terminal and the output voltage is provided at the first terminal.

In the first mode of operation, the input voltage supplied to the first terminal is converted into a higher voltage and provided at the second terminal. In the second mode of operation, the input voltage is fed to the second terminal, is converted into a lower voltage and provided at the first terminal. The conversion of the input voltage into the output voltage is performed in each case in the first, second and third phases in which the three capacitors are interconnected to the switching means in each case such that the corresponding output voltage of one mode of operation appears.

By supplying the input voltage at the first or second terminal and providing the output voltage at the second or first terminal in accordance with the first or second mode of operation, it is advantageously possible with the present voltage converter to convert voltages selectively in upward or downward direction. This is possible in a particularly simple way by means of switching over using the switching means.

It is preferred that the three capacitors are dimensioned so as to be equal.

In a further development, the output voltage has 1.25 times the value of the input voltage in the first mode of operation. The output voltage has 0.8 times the value of the input voltage in the second mode of operation.

The switching from one mode of operation to the other advantageously enables to provide the respectively reciprocal value of the output voltage.

In a further embodiment, the series connection in the one phase comprises a tandem connection comprising the first, second and third capacitors. In the tandem connection, a positive electrode of the first capacitor is connected to the first terminal, a negative electrode of the first capacitor to a positive electrode of the second capacitor, a negative electrode of the second capacitor to a positive electrode of the third capacitor and a negative electrode of the third capacitor to the reference potential terminal.

Here, the phase with the series connection corresponds to a first phase in the first mode of operation and to a third phase in the second mode of operation.

In a further development, the first path comprises the first capacitor and the second path comprises the second capacitor in a third phase of the first mode of operation and in a second phase of the second mode of operation. In this arrangement, the positive electrode of the first capacitor is coupled to the positive electrode of the second capacitor and to the first terminal. Moreover, the negative electrode of the first capacitor is coupled to the negative electrode of the second capacitor and to the second terminal.

This realization without the third capacitor advantageously results in a simplification of the switching means.

In an alternative embodiment, the respective first path comprises in each case in the two other phases a further tandem connection comprising the first and second capacitors. The respective second path comprises the third capacitor whose positive electrode is coupled to the second terminal.

In a further development, in the second phase of the first mode of operation and in the first phase of the second mode of operation, the positive electrode of the first capacitor is coupled to the second terminal, the negative electrode of the first capacitor is coupled to the positive electrode of the second capacitor and to the first terminal, and the negative electrode of the second capacitor is coupled to the negative electrode of the third capacitor in the further tandem connection. In the third phase of the first mode of operation and in the second phase of the second mode of operation, the positive electrode of the second capacitor is coupled to the second terminal, the negative electrode of the second capacitor is coupled to the positive electrode of the first capacitor and to the first terminal, and the negative electrode of the first capacitor is coupled to the negative electrode of the third capacitor in the further tandem connection.

In a further development, the first and second modes of operation comprise in each case a cyclic sequence of the first, second and third phases.

Here, the first phase of the first mode of operation corresponds to the third phase of the second mode of operation. The second phase of the first mode of operation corresponds to the first phase of the second mode of operation and the third phase of the first mode of operation corresponds to the second phase of the second mode of operation.

In a further development, a second output voltage is provided in the first mode of operation at a third terminal which is connected to the negative electrode of the third capacitor, at least in the second phase. The second output voltage has 0.75 times the amount of the input voltage.

Advantageously, the second output voltage is additionally provided in the first mode of operation without any change in the voltage converter. The voltage converter thus allows an upward and downward conversion of the input voltage at the same time.

In a further embodiment, the switching means comprises at least one controlled switch for switchably connecting an input to an output, and has several switching elements. The controlled switch comprises a transistor whose first terminal forms the input and whose second terminal forms the output of the controlled switch.

The controlled switch advantageously contributes to a reduction of the noise of the voltage converter and hence to an increase of the electromagnetic compatibility.

In a further development, the transistor of the controlled switch comprises a control terminal which is switchably connected to a voltage source for switching off the transistor or to an output of a transconductance amplifier. A first input of the transconductance amplifier is fed with a target voltage. A further input of the transconductance amplifier is fed with a signal derived from the output voltage of the voltage converter.

The transistor is operated as an adjustable resistor and controlled through the ratio between the signal derived from the output voltage and the target voltage.

Advantageously, this control scheme reduces the noise of the voltage converter and thus improves the electromagnetic compatibility.

In a further embodiment, a switching element comprises an electronic switch or a transmission gate.

In a further development, the switching means comprises further switching elements for the respective operation of the voltage converter in a third mode of operation in which the output voltage has 1.33 times the value of the input voltage, a fourth mode of operation in which the output voltage has 1.5 times the value of the input voltage, a fifth mode of operation in which the output voltage is twice the input voltage, and for the operation in a sixth mode of operation in which the level of the output voltage is equal to the level of the input voltage. Here, the third, fourth and fifth modes of operation each comprise at least two phases. The sixth mode of operation is realized in at least one phase.

Advantageously, six different modes of operation are realized with a minimum number of switching elements and with only three capacitors. In this way, it is easier to produce an output voltage which is as close as possible to a desired voltage value.

In one embodiment, a circuit arrangement with a voltage converter as described above comprises an input, an output, at least one further output for connecting in each case one component to be driven, at least one current source, a control unit as well as a selection unit. Depending on the mode of operation of the voltage converter, the input is coupled to its first terminal or to its second terminal. The input is fed with a supply voltage. The output voltage is provided at that output which depending on the mode of operation of the voltage converter is coupled to its second terminal or its first terminal in a way inverse to the coupling of the first and second terminals to the input. The at least one current source has its input side connected to the input of the circuit arrangement or to the output of the circuit arrangement in a switchable way. Its output side is connected to the at least one further output. The control unit is arranged for switching the respective switchable connection of the at least one current source between the output and the input. The selection unit is coupled to an interface and designed for selecting a mode of operation of the voltage converter and for driving the control unit as a function of information transmitted by the interface.

The supply voltage supplied to the input of the circuit arrangement is converted into the output voltage using the voltage converter. In this process, the selection unit defines the mode of operation of the voltage converter and hence the level of the output voltage on the basis of the information provided via the interface. Considering the required output voltage, the mode of operation can be chosen automatically. The output voltage is provided at the output of the circuit arrangement. With a corresponding setting by the control unit, the output voltage is additionally fed to the at least one current source in each case. Alternatively, the at least one current source is fed with the supply voltage with an opposite setting by the control unit. A current for operating the component to be connected is delivered at the at least one further output.

Advantageously, this circuit arrangement makes it possible to switch the input of the at least one current source between the supply voltage and the output voltage so as to further raise the efficiency.

BRIEF DESCRIPTION OF THE DRAWINGS

The invention is explained in more detail below by means of several exemplary embodiments with the aid of the Figures. Components and circuit parts with the same function and effects have identical reference signs. In so far as circuit parts or components have identical function, the description thereof is not repeated in each of the following Figures.

DETAILED DESCRIPTION OF THE DRAWINGS

Figure 1A:
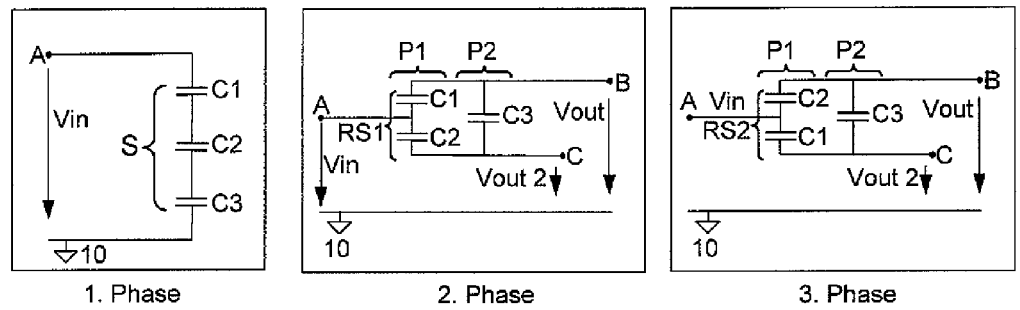
FIGS. 1A and 1B show a first exemplary embodiment of a voltage converter according to the invention.
Figure 1B:
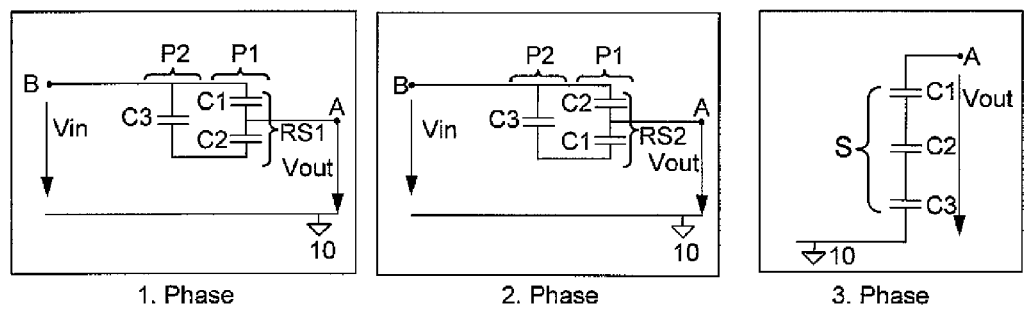

FIGS. 1A and 1B show a first exemplary embodiment of a voltage converter according to the invention. In FIG. 1A, a first mode of operation is illustrated in three phases. FIG. 1B illustrates a second mode of operation in three phases. The voltage converter comprises in each case a first capacitor C1, a second capacitor C2 and a third capacitor C3, a first terminal A, a second terminal B, a third terminal C as well as a reference potential terminal 10.

In the first phase of the first mode of operation, shown on the left in FIG. 1A, the three capacitors C1, C2, C3 are inserted in series connection between the first terminal A and the reference potential terminal 10. In detail, a positive electrode of the first capacitor C1 is coupled to the first terminal A, a negative electrode of the first capacitor C1 is coupled to a positive electrode of the second capacitor C2, a negative electrode of the second capacitor C2 is coupled to a positive electrode of the third capacitor C3 and a negative electrode of the third capacitor C3 is coupled to the reference potential terminal 10. The first terminal A is fed with an input voltage Vin.

In a second phase of the first mode of operation, illustrated in the middle of FIG. 1A, the three capacitors C1, C2 and C3 are connected in parallel in first and second paths P1, P2. The first path P1 comprises a first tandem connection RS1 comprising the first capacitor C1 and the second capacitor C2. The second path P2 comprises the third capacitor C3. In this arrangement, the positive electrode of the first capacitor C1 is coupled to the positive electrode of the third capacitor C3, the negative electrode of the first capacitor C1 is coupled to the positive electrode of the second capacitor C2 and to the first terminal A, and the negative electrode of the second capacitor C2 is coupled to the negative electrode of the third capacitor C3. The positive electrodes of the first and third capacitors C1, C3 form the second terminal B. The negative electrodes of the second and third capacitors C2, C3 together form the third terminal C.

In a third phase of the first mode of operation, shown on the right in FIG. 1A, the first path P1 comprises a further tandem connection RS2. In the further tandem connection RS2, the positive electrode of the second capacitor C2 is coupled to the positive electrode of the third capacitor C3, the negative electrode of the second capacitor C2 is coupled to the positive electrode of the first capacitor C1 as well as to the first terminal A, and the negative electrode of the first capacitor C1 is coupled to the negative electrode of the third capacitor C3. In this arrangement, the positive electrodes of the second and third capacitors C2, C3 form the second terminal B. The negative electrodes of the first and third capacitors C1, C3 form the third terminal C. An output voltage Vout is provided at the second terminal B, a further output voltage Vout2 is provided at the third terminal C. Here, the output voltage Vout has 1.25 times the value of the input voltage Vin. The further output voltage Vout2 has 0.75 times the value of the input voltage Vin.

The first, second and third phases are passed through cyclically, clocked by an internal clock signal. When an input voltage Vin of, for instance, 4 V is supplied, the voltages adjust in the first phase such that a voltage of 1 V is applied to each of the first and second capacitors, and a voltage of 2 V is applied to the third capacitor C3. In the second and third phases, the voltage drops at the capacitors C1, C2 and C3 remain equal, but owing to the different interconnection the output voltage Vout adjusts at the second terminal B at a level of 5 V, and the further output voltage Vout2 at the third terminal C at a level of 3 V. In the third phase, the voltage values remain unchanged due to the different interconnection. Any drift of potential is counteracted by the switching process. The charges of the capacitors are balanced.

FIG. 1B shows the second mode of operation of the voltage converter. The second mode of operation likewise comprises first, second and third phases. The first phase of the second mode of operation, illustrated on the left, corresponds as regards its arrangement to the second phase of the first mode of operation from the middle of FIG. 1A. The second phase of the second mode of operation, illustrated in the middle of FIG. 1B, corresponds to the third phase of the first mode of operation from FIG. 1A right side. The third phase of the second mode of operation, shown on the right in FIG. 1B, corresponds to the first phase of the first mode of operation from the left of FIG. 1A. In all three phases of the second mode of operation, the input voltage Vin is fed to the second terminal B, and the output voltage Vout is provided at the first terminal A. The third terminal C is not used in the second mode of operation.

The output voltage Vout has 0.8 times the amount of the input voltage Vin in the second mode of operation.

A switching means which is not shown here is provided for the realization of the different interconnections of the three capacitors C1, C2 and C3 in each of the three phases of the first and second modes of operation. The switching means comprises respective terminals for connecting the first, second and third capacitors C1, C2, C3. In addition, the switching means comprises at least one controlled switch illustrated in FIG. 3, as well as several switching elements. Here, a switching element can be realized as an electronic switch or a transmission gate, for example.

The embodiment of the voltage converter as shown in FIGS. 1A and 1B and its operation in the first and second modes of operation advantageously enable to convert the input voltage Vin into both a higher value of the output voltage Vout and a lower value of the output voltage Vout.

Figure 2A:
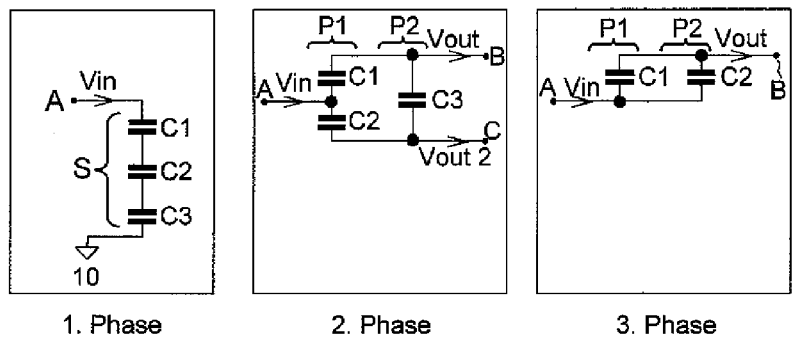
FIGS. 2A and 2B show a further exemplary embodiment of a voltage converter according to the invention.
Figure 2B:
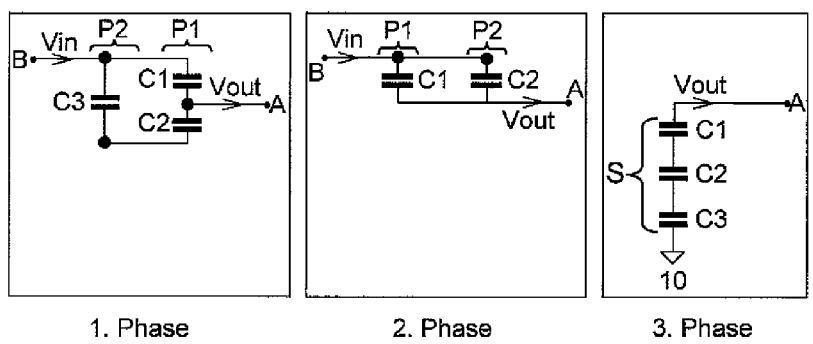

FIGS. 2A and 2B show a further exemplary embodiment of a voltage converter according to the invention. FIG. 2A shows the three phases of the first mode of operation. The embodiment of the voltage converter of FIG. 2A corresponds to the embodiment of the voltage converter of FIG. 1A, with the exception of the third phase. In the third phase of FIG. 2A, the voltage converter is realized without the third capacitor C3. Thus, the first path P1 comprises the first capacitor C1, and the second path P2 comprises the second capacitor C2. The negative electrode of the first capacitor C1 is coupled to the first terminal A as well as to the negative electrode of the second capacitor C2. The positive electrode of the first capacitor C1 is coupled to the positive electrode of the second capacitor C2 and to the second terminal B. As described in FIG. 1A, the output voltage Vout provided at the second terminal B in FIG. 2A again is 1.25 times the value of the input voltage Vin. The further output voltage Vout2 additionally provided at the third terminal C in the second phase is 0.75 times the value of the input voltage Vin.

FIG. 2B illustrates the second mode of operation of this embodiment of the voltage converter. As described in FIG. 1B, the first phase of FIG. 2B likewise corresponds to the second phase of FIG. 2A, the third phase of FIG. 2A corresponds to the second phase of FIG. 2B and the first phase of FIG. 2A corresponds to the third phase of FIG. 2B. The output voltage Vout is provided at the first terminal A in the second mode of operation with a level of 0.8 times the value of the input voltage Vin.

This embodiment of the voltage converter advantageously allows a conversion of the input voltage Vin in upward and downward directions, too. Moreover, this embodiment is particularly advantageous as it requires fewer switching elements.

TABLE 1

| Switch | Mode of operation | | | | | | |
|---|---|---|---|---|---|---|---|
|  | 1:1 | 1:1.25 | 1:0.8 | 1:1.33 | 1:0.75 | 1:1.5 | 1:2 |
| C1−− ... C2+ |  | Ph1 | Ph3 | Ph1 | Ph2 | Ph1 |  |
| C2− ... C3− |  | Ph2 | Ph2 |  |  |  |  |
| C2− ... C3+ |  | Ph1 | Ph3 | Ph1 | Ph2 |  |  |
| 10 ... C2− |  |  |  |  |  | Ph1 | Ph1 |
| 10 ... C3− |  | Ph1 | Ph3 | Ph1 | Ph2 |  | Ph2 |

TABLE 1-continued

| | | | | Mode of operation | | | |
|---|---|---|---|---|---|---|---|
| Switch | 1:1 | 1:1.25 | 1:0.8 | 1:1.33 | 1:0.75 | 1:1.5 | 1:2 |
| Vin ... C1− | | Ph2, Ph3 | | Ph2 | | Ph2 | |
| Vin ... C1+ | Var1 | Ph1 | Ph1, Ph2 | Ph1 | Ph1 | Ph1 | |
| Vin ... C2− | | Ph3 | | Ph2 | | Ph2 | Ph2 |
| Vin ... C2+ | Var2 | Ph2 | Ph1 | | Ph1 | | Ph1 |
| Vin ... C3− | | | | Ph2 | | | Ph1 |
| Vin ... C3+ | Var3 | | Ph2 | | Ph1 | | Ph2 |
| Vout ... C1− | | | Ph1, Ph2 | | Ph1 | | |
| Vout ... C1+ | Var1 | Ph2, Ph3 | Ph3 | Ph2 | Ph2 | Ph2 | |
| Vout ... C2− | | | Ph1 | | Ph1 | | |
| Vout ... C2+ | Var2 | Ph3 | Ph2 | Ph2 | | Ph2 | Ph2 |
| Vout ... C3− | | | | | Ph1 | | |
| Vout ... C3+ | Var3 | Ph2 | | Ph2 | | | Ph1 |

Table 1 shows an exemplary embodiment of an implementation of the switching means used for the embodiments of the voltage converter which are shown in FIGS. 1A and 1B as well as 2A and 2B. Here, switches are entered in the lines of the first column, the further columns each showing a mode of operation. The switches are implemented in the switching means as switching elements or a controlled switch. Preferably, one switch is implemented as a controlled switch in each mode of operation, all further switches are realized as switching elements. In Table 1, C1− designates the negative electrode of the first capacitor C1, C1+ the positive electrode of the first capacitor C1. C2+ designates the positive electrode of the second capacitor C2, C2− the negative electrode of the second capacitor C2. C3+ designates the positive electrode of the third capacitor C3, C3− the negative electrode of the third capacitor C3. 10 designates the reference potential terminal 10. Vin designates a respective coupling to the first terminal A or the second terminal B, which is fed with the input voltage Vin in the respective mode of operation. Vout designates the coupling to the second terminal B or the first terminal A, at which the output voltage Vout is provided in the respective mode of operation. To give an example, the switch C2− ... C3+ designates the interconnection of the negative electrode of the second capacitor C2 to the positive electrode of the third capacitor C3. The switch Vin ... C1+ designates the interconnection between the positive electrode of the first capacitor C1 and the supply point of the input voltage Vin.

The modes of operation show the respectively differing phases. Ph1 designates the first phase, Ph2 denotes the second phase and Ph3 refers to the third phase. The third column of the Table illustrates the first mode of operation in which the output voltage Vout is 1.25 times the input voltage Vin. The fourth column shows the second mode of operation in which the output voltage Vout is 0.8 times the input voltage Vin. The sixth column shows a further mode of the first mode of operation in which the output voltage Vout is 0.75 times the input voltage Vin. As follows from the Table, the switching means comprises 15 switches for implementing these modes of operations.

Further modes of operations can be implemented by adding just a few more switches. The fifth column shows the implementation of a third mode of operation in which the output voltage Vout is 1.33 times the input voltage Vin. The seventh column illustrates a fourth mode of operation in which the output voltage Vout is 1.5 times the input voltage Vin. The eighth column shows a fifth mode of operation in which the output voltage Vout is twice the input voltage Vin.

The second column of the Table shows a sixth mode of operation in which the level of the output voltage Vout is equal to the level of the input voltage Vin. The switching means illustrated here offers three ways of realization which are designated with Var1, Var2 and Var3. The third, fourth and fifth modes of operation each are realized in two phases, the sixth mode of operation is realized in only one phase.

It is evident from Table 1 that four additional modes of operations can be realized with this voltage converter by adding merely two switches, namely switch Vin ... C3− and switch 10 ... C2−. Advantageously, the number of the switches is smaller than the sum of the switches in individual implementations for each mode of operation. Thus, this voltage converter needs the low number of only three capacitors and a low number of switches to provide the output voltage Vout in seven different output levels. This plurality of output voltage levels allows to choose, in the desired application, in each case an output voltage which is close to the desired target value because it can be produced with high efficiency.

Figure 3:
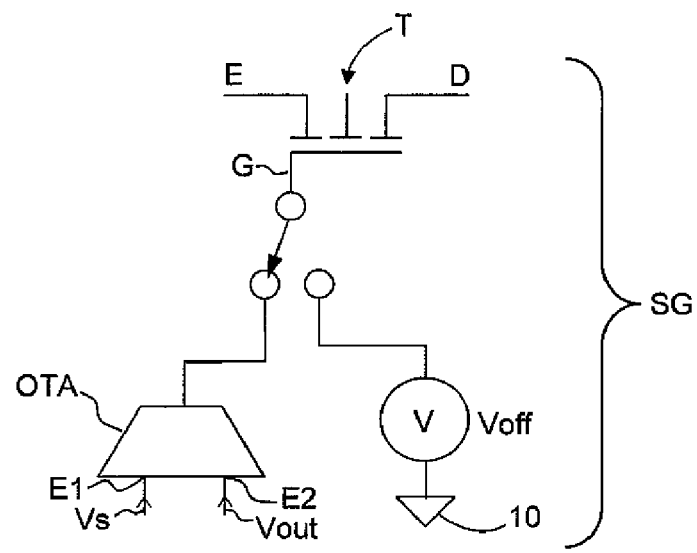
FIG. 3 shows an exemplary embodiment of a controlled switch.

FIG. 3 shows an exemplary embodiment of a controlled switch SG. The controlled switch SG comprises a transistor T which has a control terminal G that is connected in a switchable manner either to a transconductance amplifier OTA or a voltage source Voff. The voltage source Voff is related to the reference potential terminal 10. A first terminal of the transistor T forms an input E of the controlled switch. A second terminal of the transistor T forms an output D of the controlled switch. The transconductance amplifier OTA comprises a first input E1 for supplying a target voltage Vs, and a second input E2 for supplying the output voltage Vout. The transistor T is implemented as a metal oxide semiconductor transistor, MOS-transistor. It may comprise an NMOS- or PMOS-transistor with a retracted bulk terminal or a switchable bulk terminal.

The input E as well as the output D of the controlled switch are in each case end points of a switch illustrated in Table 1. The controlled switch, for instance, realizes the switch of the eighth line in Table 1, the terminal for the supply voltage Vin forming the input E and the terminal of the negative electrode of the first capacitor C1 forming the output D of the controlled switch. The transistor T is controlled through the ratio between the output voltage Vout and the target voltage Vs. In this process, the target voltage Vs is selected according to the mode of operation of the voltage converter. The transistor T is switched off through the voltage source Voff. The transistor is thus operated as an adjustable resistor.

This control scheme advantageously reduces the noise of the voltage converter. Internal losses can be increased via the adjustable resistor so as to avoid high current peaks. This improves the electromagnetic compatibility.

Figure 4:
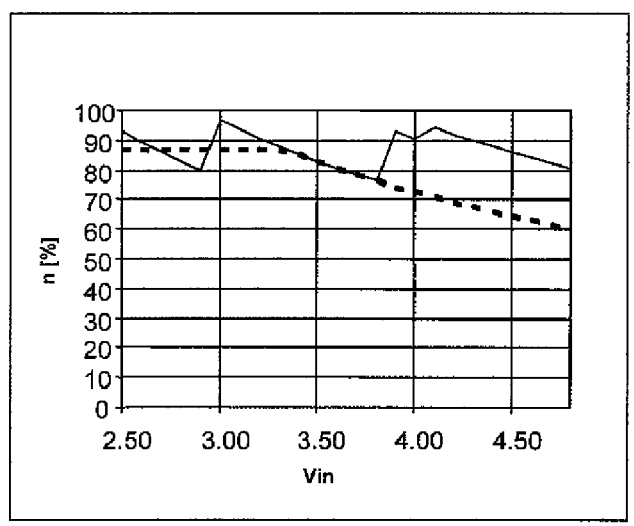
FIG. 4 shows an exemplary efficiency diagram.

FIG. 4 shows an exemplary efficiency diagram of a voltage converter. The abscissa shows the input voltage Vin with values between 2.5 and 5 V. The ordinate shows the efficiency n as percentage. The continuous line shows the efficiency of the voltage converter presented here. In comparison with this, the broken line illustrates the efficiency of an inductive boost converter. The efficiency of the voltage converter amounts to 87% on average and is almost always over 80% in the input voltage range illustrated here. Thus, the performance of this voltage converter can rather be compared with an inductive boost converter which has an efficiency factor of approximately 85%, as shown above. In addition, realizing a capacitive voltage converter is more cost-effective and space-saving since large and expensive inductive elements are not necessary.

Figure 5:
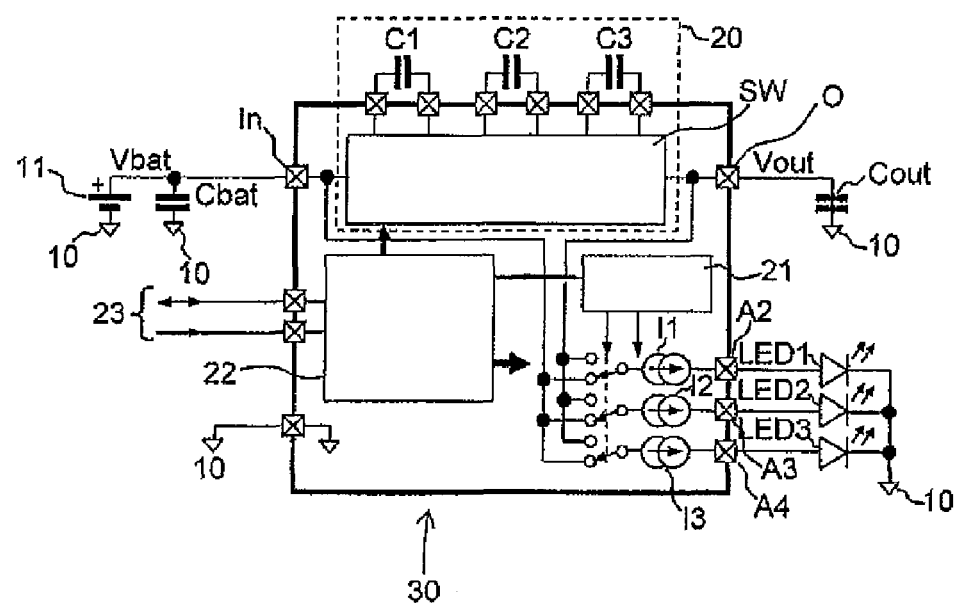
FIG. 5 shows an exemplary embodiment of a circuit arrangement comprising a voltage converter according to the invention.

FIG. 5 shows an exemplary embodiment of a circuit arrangement having a voltage converter according to the invention. The circuit arrangement 30 comprises a voltage converter 20, a control unit 21, a selection unit 22 and three current sources I1, I2 and I3. An input In of the circuit arrangement 30 is fed with a supply voltage Vbat. An output O of the circuit arrangement 30 provides the output voltage Vout. Depending on the mode of operation of the voltage converter 20, the input In is coupled to its first terminal A or its second terminal B. Depending on the mode of operation of the voltage converter 20, the output O is coupled to its second terminal B or its first terminal A, opposite to the coupling of the first and second terminals A, B to the input In. Each of the three current sources I1, I2 and I3 is coupled to the input In or the output O of the circuit arrangement 30 through a switch. The switching of these current source switches is triggered by the control unit 21. A current delivered by the current source I1 is provided at a further output A2. A current produced by the current source I2 is provided at a further output A3. A current produced by the current source I3 is provided at a further output A4. The level of the current provided at the further outputs A2, A3, A4 is determined in each case by the selection unit 22. Control unit 21 and selection unit 22 are components of the 9 Channel Advanced Command Driven RGB/White LED Driver available from austriamicrosystems AG as AS3665.

The selection unit 22 is coupled to an interface 23, the switching means SW of the voltage converter 20 and the control unit 21. On the basis of the information transmitted by the interface 23, the selection unit 22 selects the mode of operation of the voltage converter 20 and forwards corresponding control information to the control unit 21. The required voltage for operating the current sources I1, I2, I3 is also taken into account in the selection of the mode of operation. This procedure is referred to as automatic mode-switching.

As described above, the voltage converter 20 comprises the first, second and third capacitors C1, C2, C3 as well as the switching means SW. The switching means SW is realized here as illustrated in Table 1 and designed for realizing all modes of operation which are shown in this Table. To give an example, the first, second and third capacitors C1, C2, C3 are equal and dimensioned with 500 nF each.

The external wiring of the circuit arrangement 30 is also shown. The supply voltage Vbat is produced by a voltage source 11 and fed to the input In via a capacitor Cbat. A capacitor Cout is connected downstream of the output O of the circuit arrangement 30 and smoothes the output voltage Vout. The capacitors Cbat and Cout are dimensioned with 1 µF, for example. The further outputs A2, A3, A4 are connected to one light-emitting diode LED1, LED2 and LED3 each, for instance. The light-emitting diodes LED1, LED2 and LED3 are related in each case to the reference potential terminal 10.

Thus, the circuit arrangement 30 realizes a driver for the three light-emitting diodes LED1, LED2 and LED3. Advantageously, the voltage provided in each case for operating a respective light-emitting diode is able to determine the mode of operation of the voltage converter. This increases the efficiency of the overall circuit.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A voltage converter, comprising:
a first terminal and a second terminal coupled to a switching means;
the switching means being coupled to respective terminals for connecting a first capacitor, a second capacitor and a third capacitor; and
the voltage converter being configured to be operated in first and second modes of operation each comprising at least three phases, wherein the three capacitors are inserted in series connection between the first terminal and a reference potential terminal in one phase of said at least three phases, and in each of the two other phases a first path and a second path are provided in each case in parallel connection with at least one of the three capacitors related to the second terminal,
wherein the first path comprises the first capacitor and the second path comprises the second capacitor in a third phase of the first mode of operation and in a second phase of the second mode of operation, the positive electrode of the first capacitor being coupled to the positive electrode of the second capacitor and to the first terminal, and the negative electrode of the first capacitor being coupled to the negative electrode of the second capacitor and to the second terminal.

2. The voltage converter according to claim 1, wherein the first terminal is fed with an input voltage and an output voltage is provided at the second terminal in the first mode of operation, and the input voltage is supplied to the second terminal and the output voltage is provided at the first terminal in the second mode of operation.

3. The voltage converter according to claim 2, wherein the output voltage has 1.25 times the value of the input voltage in the first mode of operation and the output voltage has 0.8 times the value of the input voltage in the second mode of operation.

4. The voltage converter according to claim 2, wherein a second output voltage with a level of 0.75 times the value of the input voltage is provided in the first mode of operation at a third terminal which is connected to the negative electrode of the third capacitor, at least in the second phase.

5. The voltage converter according to claim 2, wherein the switching means comprises:
at least one controlled switch for switchably connecting an input to an output, the controlled switch comprising a transistor whose first terminal forms the input and whose second terminal forms the output,
several switching elements, and
further switching elements for the respective operation of the voltage converter in a third mode of operation in which the output voltage has 1.33 times the value of the input voltage,
a fourth mode of operation in which the output voltage has 1.5 times the value of the input voltage, and
a fifth mode of operation in which the output voltage is twice the input voltage,
a sixth mode of operation in which the level of the output voltage is equal to the level of the input voltage,
the third, fourth and fifth modes of operation comprising in each case at least two phases and the sixth mode of operation comprising at least one phase.

6. A circuit arrangement comprising a voltage converter according to claim 5, further comprising:
an input which depending on the mode of operation of the voltage converter is coupled either to its first terminal or to its second terminal and is fed with a supply voltage, an output which depending on the mode of operation of the voltage converter is coupled either to its second terminal or to its first terminal in a way inverse to the coupling of the first and second terminals to the input and at which the output voltage is provided, at least one further output for connecting a component to be driven, at least one current source which has its output side connected to the at least one further output, and has its input side connected either to the input or to the output in a switchable manner, a control unit arranged for switching the respective switchable connection of the three current sources between the output and the input, and a selection unit which is coupled to an interface and is designed for selecting a mode of operation of the voltage converter and for driving the control unit as a function of information transmitted by the interface.

7. The circuit arrangement according to claim 6, wherein the component to be driven comprises a light-emitting diode.

8. The voltage converter according to claim 1, wherein the series connection in said one phase comprises a tandem connection comprising the first, second and third capacitors and in which a positive electrode of the first capacitor is connected to the first terminal, a negative electrode of the first capacitor to a positive electrode of the second capacitor, a negative electrode of the second capacitor to a positive electrode of the third capacitor and a negative electrode of the third capacitor to the reference potential terminal.

9. The voltage converter according to claim 1, wherein each respective first path of the two other phases comprises a further tandem connection comprising the first and second capacitors, and the respective second path comprises the third capacitor whose positive electrode is coupled to the second terminal.

10. The voltage converter according to claim 9, wherein in the second phase of the first mode of operation and in the first phase of the second mode of operation, the positive electrode of the first capacitor is coupled to the second terminal, the negative electrode of the first capacitor is coupled to the positive electrode of the second capacitor and to the first terminal, and the negative electrode of the second capacitor is coupled to the negative electrode of the third capacitor in the further tandem connection, and wherein in the third phase of the first mode of operation and in the second phase of the second mode of operation, the positive electrode of the second capacitor is coupled to the second terminal, the negative electrode of the second capacitor is coupled to the positive electrode of the first capacitor and to the first terminal, and the negative electrode of the first capacitor is coupled to the negative electrode of the third capacitor in the further tandem connection.

11. The voltage converter according to claim 1, wherein the first and second modes of operation comprise in each case a cyclic sequence of the first, second and third phases.

12. The voltage converter according to claim 1, wherein the switching means comprises:

at least one controlled switch for switchably connecting an input to an output, the controlled switch comprising a transistor whose first terminal forms the input and whose second terminal forms the output, and several switching elements.

13. The voltage converter according to claim 12, wherein the transistor of the controlled switch comprises a control terminal which is switchably connected to a voltage source for switching off the transistor or to an output of a transconductance amplifiers, a first input of the transconductance amplifier being fed with a target voltage and a further input of the transconductance amplifier being fed with a signal derived from the output voltage.

14. The voltage converter according to claim 12, wherein a switching element comprises an electronic switch or a transmission gate.

* * * * *